United States Patent [19]

Teramura et al.

[11] 4,134,133

[45] Jan. 9, 1979

[54] METHOD FOR INTERLINE-CODING FACSIMILE SIGNAL

[75] Inventors: Hiroichi Teramura, Tokyo; Yasuhiro Yamazaki, Hiratsuka; Yasushi Wakahara, Tokyo, all of Japan

[73] Assignee: Kokusai Denshin Denwa Kabushiki Kaisha, Japan

[21] Appl. No.: 817,421

[22] Filed: Jul. 20, 1977

[30] Foreign Application Priority Data

Jul. 21, 1976 [JP] Japan ................................. 51-87042

[51] Int. Cl.² ...................... H04N 1/40; H04N/7/12
[52] U.S. Cl. ................................. 358/261; 358/260; 340/347 DD
[58] Field of Search ....................... 358/260, 358/261; 340/347 DD

[56] References Cited

U.S. PATENT DOCUMENTS

| | | | |
|---|---|---|---|
| 3,813,485 | 5/1974 | Arps | 358/261 |
| 3,830,966 | 8/1974 | Aldrich | 358/261 |
| 3,916,095 | 10/1975 | Weber | 358/261 |
| 3,927,251 | 12/1975 | White | 358/261 |
| 4,070,694 | 1/1978 | Sakamoto | 358/261 |

*Primary Examiner*—Howard W. Britton
*Attorney, Agent, or Firm*—Robert E. Burns; Emmanuel J. Lobato; Bruce L. Adams

[57] ABSTRACT

A method for interline-coding a facsimile signal, in which information of scanning lines of the input facsimile signal is alternately divided into information of at least one first unit line and information of at least one second unit line. A first one of the first unit lines is first coded in accordance with a predetermined coding principle. The information of the next one of the first unit lines is secondly coded in accordance with a predetermined coding principle prior to coding of information of the first one of said second unit lines. The information of the first one of the second unit lines is thirdly coded by two-dimensional predictive coding using, as reference information, the information of the first one and the next one of the first unit lines. The operations of the second coding and the operation of the third coding are repeatedly achieved thereafter.

11 Claims, 22 Drawing Figures

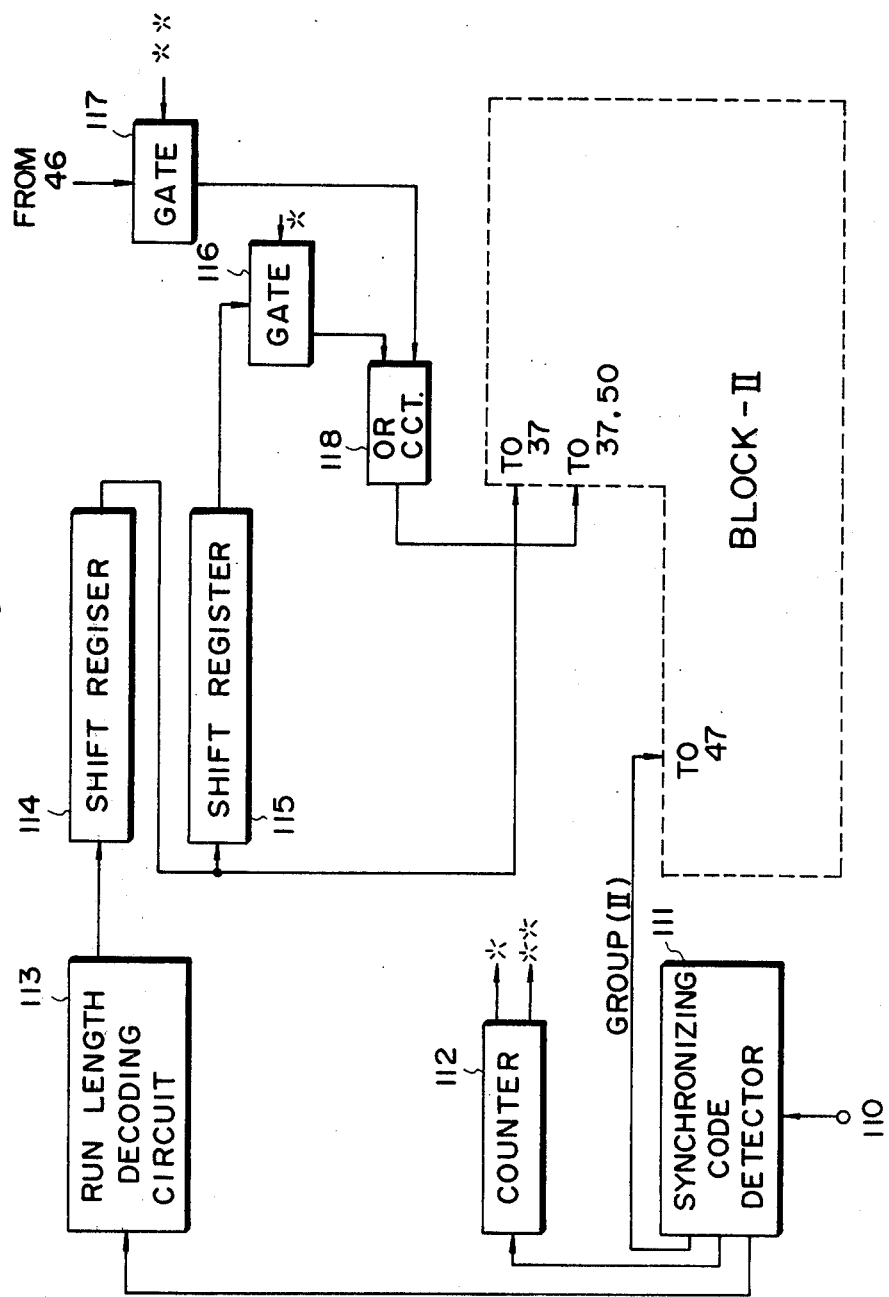

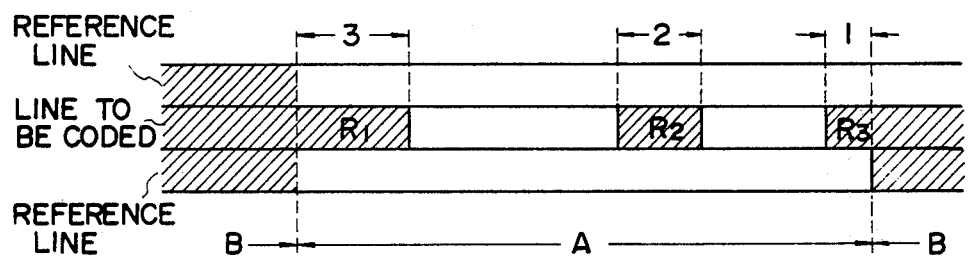
Fig. 13A
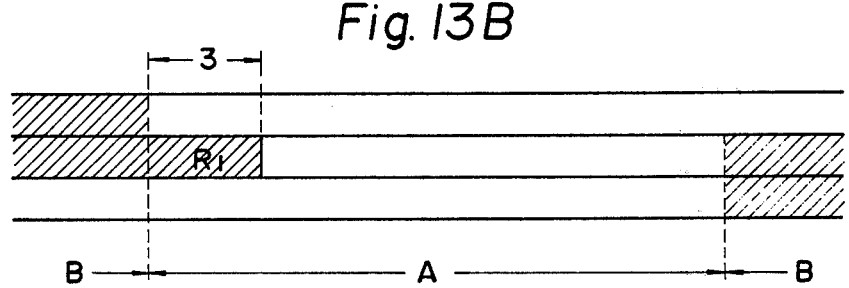
Fig. 13B
Fig. 15
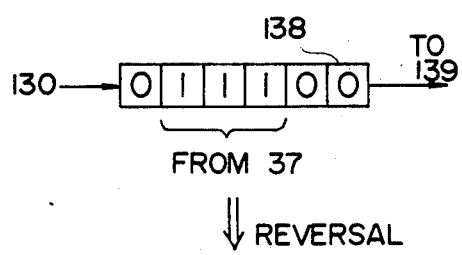
Fig. 16
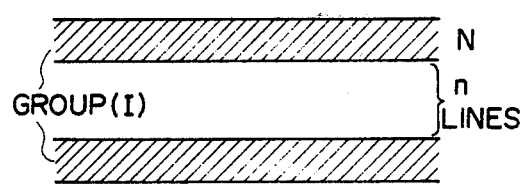

METHOD FOR INTERLINE-CODING FACSIMILE SIGNAL

BACKGROUND OF THE INVENTION

This invention relates to a method for efficiently coding a facsimile signal having high correlation in two dimensions to shorten the facsimile signal transmission time.

Facsimile coding methods heretofore proposed are: (1) a run length coding method, in which signals of each scanning line obtained by scanning are arranged in a time serial configuration and then the run lengths of white and black levels are successively coded and transmitted, and (2) a method for coding information change picture elements in facsimile signal, in which information change picture elements of respective scanning lines are coded in a successive order utilizing the information of the immediately preceding scanning line as reference information (refer to Japanese Patent Laid-Open No. 30418/76). However, the coding method (1) does not ever make use of the property that a picture signal has high correlation in a vertical direction, and hence is not sufficient in the compression effect. Since the method (2) utilizes the information of the immediately preceding scanning line, this method has a marked compression effect, but has the defect that an error, for example, on the transmission line, may have an extremely wide-spread influence.

SUMMARY OF THE INVENTION

An object of this invention is to provide a method for interline-coding a facsimile signal, which overcomes such defects of the two conventional coding methods as mentioned above, and which markably removes redundancy of a facsimile signal by the use of a relatively small number of memories and a simple structure to enable a marked compression of a required transmission time with respect to the bane-time product, and which confines the influence of an error appearing in the transmission line or the like within a narrow area of one to several scanning lines to effectively prevent deterioration of the picture quality.

BRIEF DESCRIPTION OF THE DRAWINGS

The principle, construction and operation of this invention will be clearly understood from the following detailed description taken in conjunction with the accompanying drawings, in which:

FIGS. 5, 10 and 12 are block diagrams showing examples of a receiver for receiving code trains produced by the embodiments of FIGS. 4, 9 and 11, respectively;

FIG. 13 shows another method of coding;

FIG. 15 is a diagram explanatory of the operation of a shift register employed in the embodiment of FIG. 14;

FIG. 16 is a diagram explanatory of an example of altering the number of signal lines of the group II in this invention;

DESCRIPTION OF THE PREFERRED EMBODIMENTS

Figure 1:
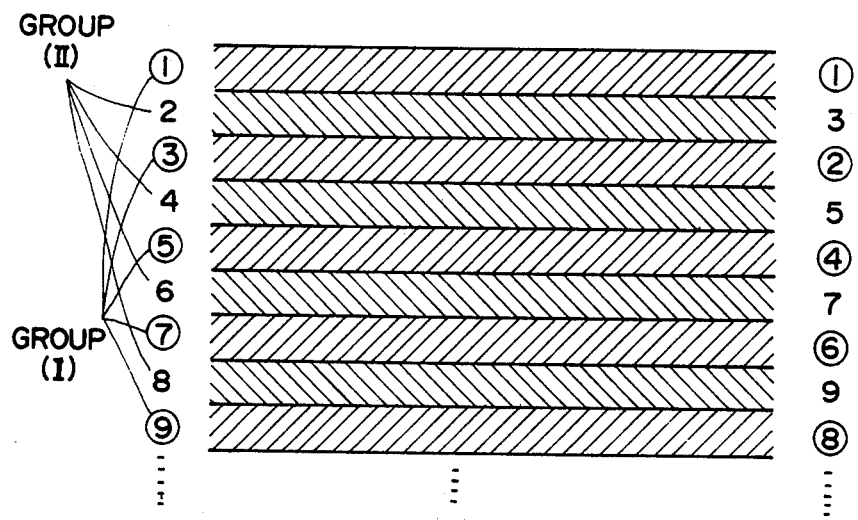
FIGS. 1, 6A, 6B, 7A and 7B are diagrams explanatory of classification of a facsimile signal into two groups in this invention.

The principles of this invention will first be described. Information of respective scanning lines of a facsimile signal obtained by scanning is divided into a group of odd-numbered lines as first unit lines (which group will hereinafter be referred to as the group I) and a group of even-numbered lines as second unit lines (which group will hereinafter be referred to as the group II), as shown in FIG. 1. Coding of each scanning line is not performed in the order of their line numbers (the numbers of the scanning order) but in the order of 1, 3, 2, 5, 4, 7, 6, . . . , as shown in the righthand column of FIG. 1. Namely, the odd-numbered scanning lines are each coded before the even-numbered scanning line immediately preceding the odd-numbered one, and the even-numbered scanning lines are each coded after the odd-numbered scanning line immediately succeeding the even-numbered one. Thereafter, entirely different coding methods are respectively applied to the abovesaid two groups, as described hereinbelow. For instance, the odd-numbered scanning lines are coded by the known run-length coding method or the method for coding information change picture elements in the fascimile signal, and the even-numbered scanning lines are coded by a method which achieves predictive coding of each scanning line utilizing information of the immediately preceding (above) or succeeding (below) the scanning line. In this case, the picture elements of the even-numbered scanning lines can each be coded using the information of upper and lower picture elements of extremely high correlation, so that a very remarkable compression effect can be obtained, providing an appreciable compression effect as compared with that of the conventional methods, as a whole.

Figure 2:
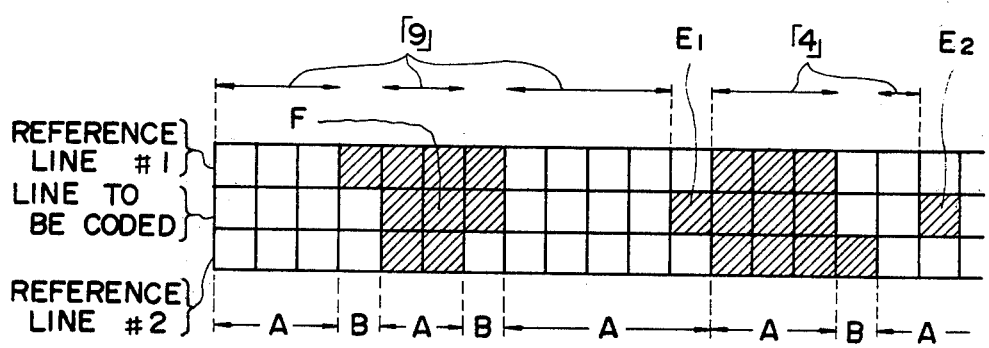
FIG. 2 is a diagram explanatory of the principle of coding signals of a group II in this invention.

FIG. 2 is a diagram explanatory of one of methods for coding one line of the even-numbered group of the original picture in this invention. Let it be assumed that the central one of three scanning lines in FIG. 2 is an even-numbered one and will be coded. The picture elements on the two odd-numbered lines above and below the line to be coded are reference information which is utilized in the predictive coding, and will hereunder be called the reference lines #1 and #2, respectively as shown in FIG. 2. In FIG. 2, hatched small sections represent black picture elements and non-hatched small sections white picture elements.

The line to be coded, depicted in FIG. 2, is classified into, for example, two kinds of areas, depending upon whether or not the information of the upper and that of the lower reference line are the same. In other words, the line to be coded is divided into an area A (a first area) in which the upper and lower reference picture elements are both black or white, and an area B (a second area) in which one of the upper and lower picture elements is black and the other is white.

In the coding of the picture elements in the area A of the line to be coded, for example, two upper and lower picture elements (picture elements of the odd-numbered lines) are used as the reference information and the picture elements to be coded are predicted to be the same as the reference picture elements. Only the address (position) of each picture element mispredicted is coded in accordance with such variable length codes shown in Table 1, using the number of picture elements (except the picture elements in the area B) counted from an immediately preceding mispredicted picture element (in the same of a first mispredicted picture element in the line, from the first picture element of the line).

Table 1

| Length | Code |
|---|---|
| 0 ~ 3 | 0 ** |
| 4 ~ 19 | 10 **** |
| 20 ~ 83 | 110 ****** |
| 84 ~ 339 | 1110 ******** |
| — | — |
| ~ (the number of picture elements in one line) | — |

In the example of FIG. 2, the line to be coded is classified into the two areas A and B, as illustrated, and the picture elements indicated by $E_1$ and $E_2$ in the area A are different from the reference picture elements just above and below them and hence are the abovesaid mispredicted picture elements. Since the picture element $E_1$ is the first mispredicted picture element in the line, its address is coded into a code "100101" from Table 1, using the number of the picture element counted from the left-hand end of the line which are included in the area A, that is, "9". The address of the mispredicted picture element $E_2$ after the picture element $E_1$ is coded into a code "100000" by the number of picture elements (= "4" except the area B) lying between the picture element $E_2$ and the immediately preceding mispredicted picture element $E_1$, as is the case of the latter.

On the other hand, since each picture element of the area B has a relatively large amount of information because the two reference picture elements above and below it are different from each other, no predictive coding is performed. For instance, the picture element information of each of the area B is sent after being coded into "1" or "0" depending upon whether the picture element is black or white.

Figure 3A:
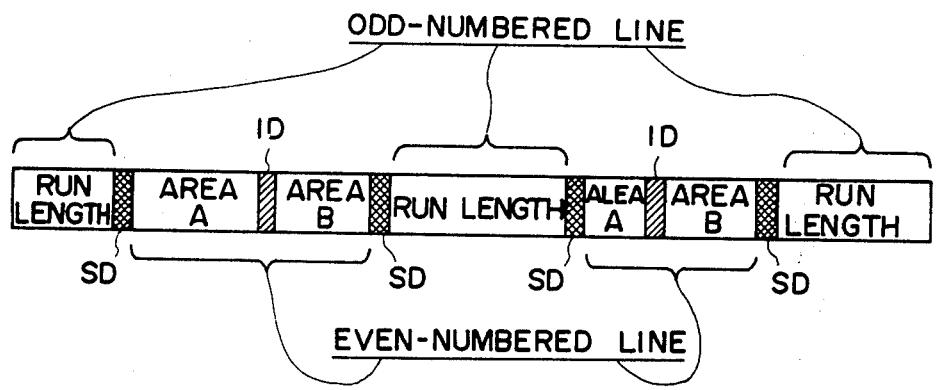
FIGS. 3A and 3B are signal arrangement diagrams showing examples of signals formed and sent according to this invention.
Figure 3B:
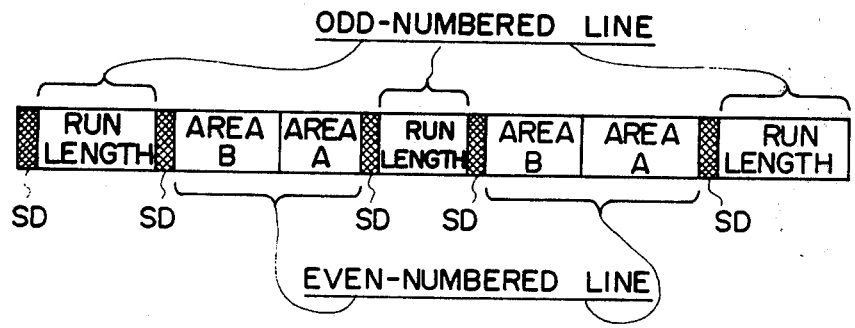

To sum up, the line to be coded in the example of FIG. 2 is coded by this invention as follows:
Area A: 100101100000 . . .
Area B: 010 . . .
The results of coding of the areas A and B are delivered out, for example, in such an order as shown in FIG. 3A. In FIGS. 3A and 3B, identification codes ID are coded for identifying the codes of the areas A and B in distinction from each other. For instance, if the picture element at the right-hand end of the coded line is always handled as the mispredicted picture element and coded in the area A, the end of the area A can be detected by decoding the above coded picture element on the receiving side, so that the identification code becomes unnecessary. Alternatively, if the signal of the area B is sent prior to that of the area A, as depicted in FIG. 3B, since the number of picture elements included in the area B is known from the information of the already-delivered-out lines above and below the line to be coded, the signals of the areas A and B can be distinguished from each other and the identification code is also unnecessary. Thus, the identification code is not always required but, for the sake of simplicity, the following description will be given on the basis of the example of FIG. 3A which employs the identification code.

Figure 4:
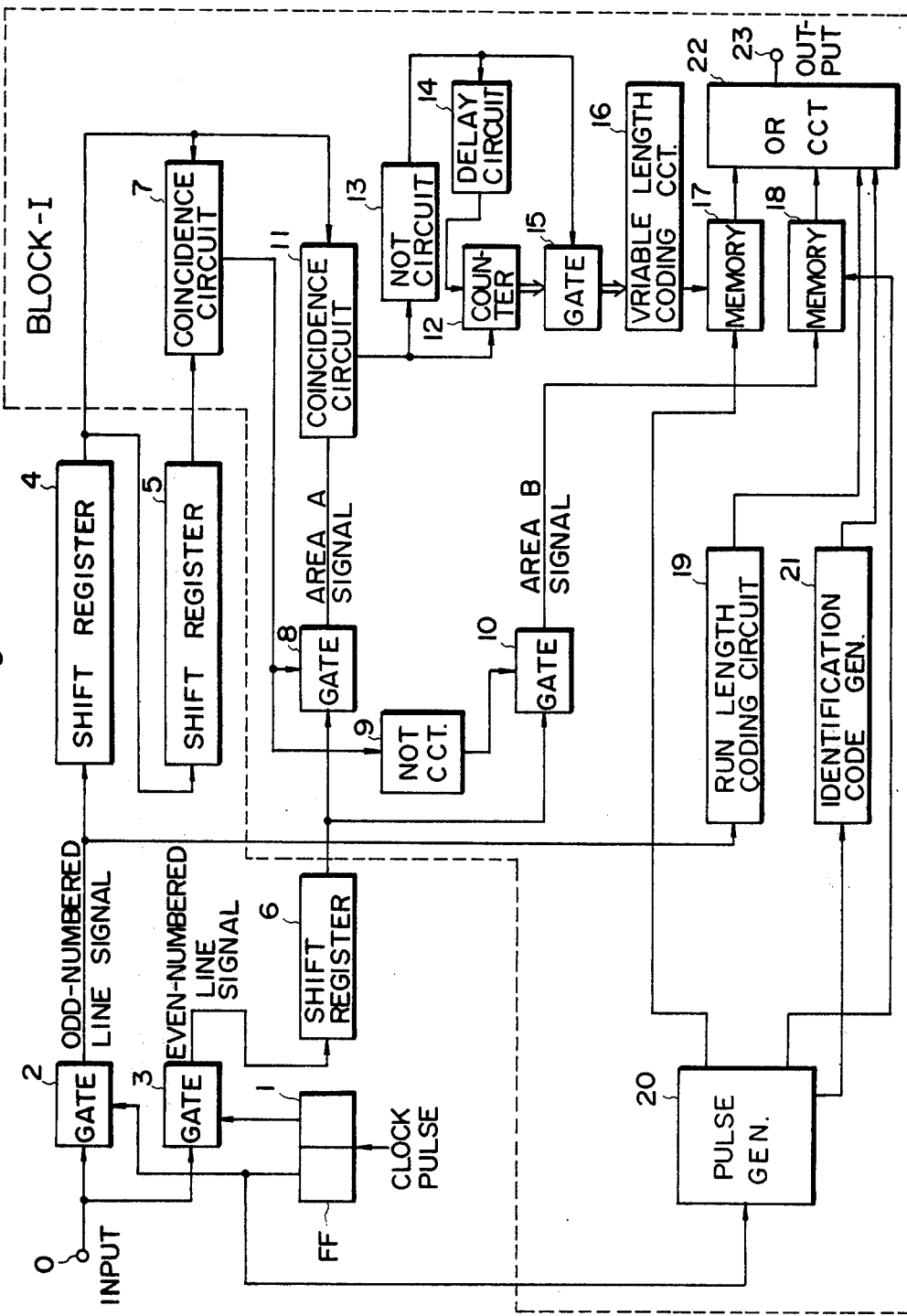
FIGS. 4, 9, 11 and 14 are block diagrams illustrating embodiments of this invention.

FIG. 4 illustrates in block form an embodiment of this invention. In FIG. 4, reference numeral 0 indicates an input terminal to which a read-out digital facsimile signal is applied; 1 designates a flip-flop; 2 identifies a gate which permits the passage therethrough of only the signals of the odd-numbered lines; 3 denotes a gate which permits the passage therethrough of only the signals of the even-numbered lines; 4 and 5 represent shift registers, each having a capacity of storing the signals of one odd-numbered line (reference information); 6 shows a shift register having a capacity of storing the signals of two even-numbered lines; 7 refers to a coincidence circuit for deciding whether the outputs from the shift registers 4 and 5 (i.e. reference picture elements) are coincident with each other or not, that is, the area is A or B; 8 indicates a gate which opens when the two reference picture elements are coincident with each other, that is, when the area is A; 9 designates a NOT circuit; 10 identifies a gate which opens when the two reference picture elements are not coincident with each other, that is, when the area is B; 11 denotes a coincidence circuit which decides whether or not the output from the shift register 6, that is, the picture element to be coded (on the even-numbered line), and the output from the shift register 4, that is, the reference picture element, are the same as each other; 12 represents a counter which, when the picture element of the area A to be coded and its reference picture element not coincident with each other, receives and counts pulses from the coincidence circuit 11 and is reset to the state 0 by the output from a delay circuit 14 described later; 13 shows a NOT circuit, 14 refers to the abovesaid delay circuit; 15 indicates a gate which opens when the output from the NOT circuit 13, that is, the picture element of the area A to be coded, and its picture element are not coincident with each other; 16 designates a variable length circuit which, when the gate 15 is opened, receives the contents of the counter 12 and performs the variable length coding, for example, as shown in Table 1 (This techniques is a known one.); 17 and 18 identify memories; 19 denotes a run length coding circuit for coding the signals of the odd-numbered line in accordance with a known run coding method; 20 represents a pulse generator which when supplied with a pulse, sends pulses to the memory 17, an identification code generator 21 and the memory 18 in this order; 21 shows the abovesaid identification code generator for inserting an identification code between the signals of the areas A and B; 22 refers to an OR circuit; and 23 indicates an output terminal. The OR circuit 22 passes therethrough first the signal from the run length coding circuit 19 and then sends the contents of the memory 17, the identification codes from the identification code generator 21 and the contents of the memory 18 to the output terminal 23.

The operation of the embodiment shown in the block diagram of FIG. 4 is as follows:

The read-out digital facsimile signal is applied to the circuitry through the input terminal 0 and the odd-numbered line signal is applied to the shift register 4 and the run length coding circuit 19 through the gate 2 on one hand, and the even-numbered line signal is applied to the shift register 6 through the gate 3 on the other hand. In the run length coding circuit 19, the odd-numbered line signal is immediately rendered into a run length code but, since the signal of the next line (even-numbered) is once stored in the shift register 6 having a capacity of two lines, coding of the even-numbered line takes place after the odd-numbered line, as shown in FIG. 1. The odd-numbered line signal is rendered into the run length code and, at the same time, stored in the shift register 4 and the signal of the immediately preceding odd-numbered line is stored in the shift register 5. In such coding of the signal of each even-numbered line stored in the shift register 6, information of the two reference lines shown in FIG. 2 is stored in the shift registers 4 and 5.

Then, the shift registers 4, 5 and 6 simultaneously start the shifting operations to begin coding of the even-numbered line stored in the shift register 6 but, since the outputs from the shift registers 4 and 5, that is, the reference information, are applied to the coincidence circuit 7, decision of the areas A and B depicted in FIG. 2 is accomplished in the coincidence circuit 7. In the case of the area A, the coincidence circuit 7 applies a pulse to the gate 8 to open it, through which the output from the shift register 6, that is, the information of the line to be coded as shown in FIG. 2 is applied to the coincidence circuit 11. The coincidence circuit 11 checks whether or not the reference information and the picture element information to be coded are coincident with each other, and, in the case of coincidence, produces a pulse and, in the case of non-coincidence, does not produce any pulse. Thus, the counter 12 counts the number of those picture elements of the area A whose information is coincident with the reference information. When they are not coincident with each other, for example, in such a case of $E_1$ in FIG. 2, the gate 15 is opened by the NOT circuit 13, so that the count value of the counter 12 is supplied to the variable length coding circuit 16. Thereafter, the counter 12 is reset to the state 0 by the output pulse from the delay circuit 14. In the variable length coding circuit 16, the count value of the counter 12, i.e. the number of picture elements of the area A at each of which the picture element to be coded and the reference picture element are not coincident with each other, is rendered into a variable length code, for example, in accordance with the code list of Table 1. The result of this coding is stored in the memory 17.

In the case of the area B, the coincidence circuit 17 does not produce any pulses, so that the gate 10 opens and the information is stored as it is in the memory 18. The results of coding obtained as described above area derived from the memories 17 and 18 at the output terminal 23 through the OR circuit 22, for instance, in such an order as shown in FIG. 3A, by the pulse produced by the pulse generator 20. The identification codes ID between the signals of the area A and B in FIG. 3A are generated by the identification code generator 21. A synchronizing code SD indicative of termination of each line is added to the information of each line by an ordinary method.

Figure 5:
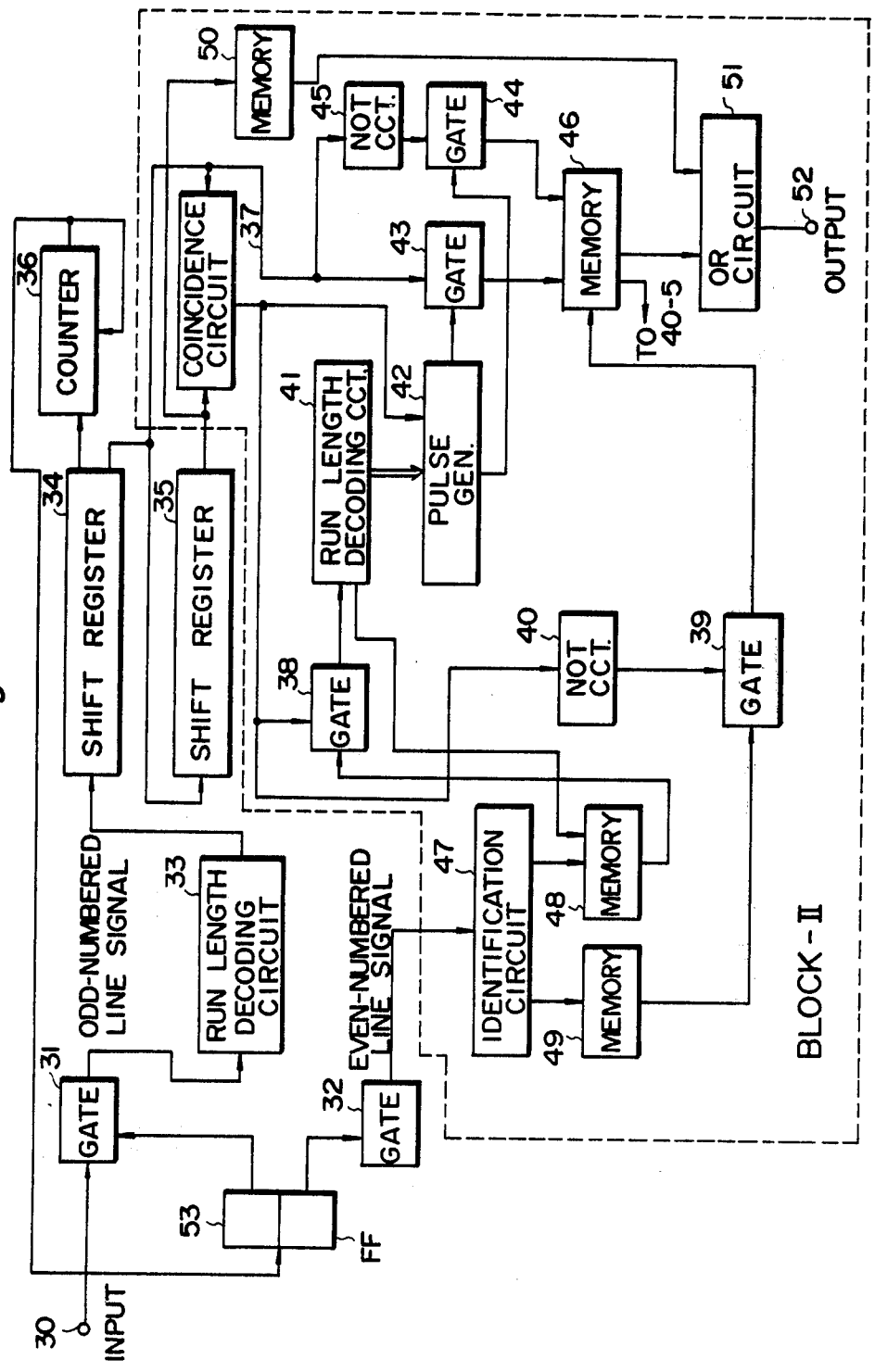
Figure 6A:
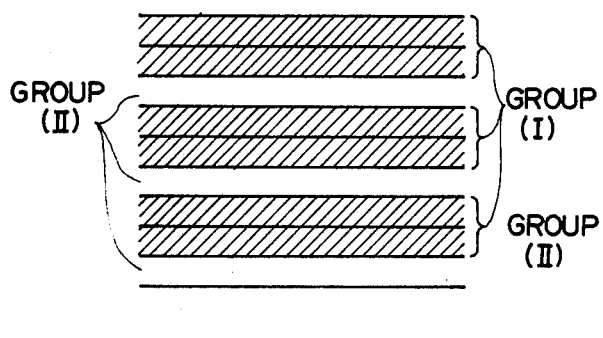
Figure 6B:
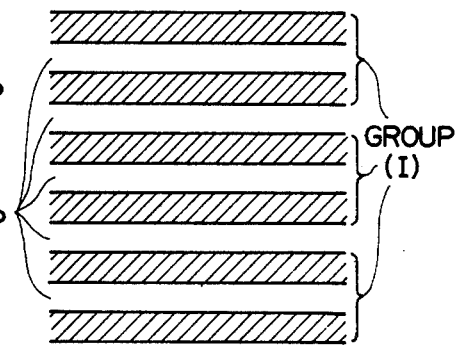

FIG. 5 is a block diagram showing an example of the structure of the receiving side for receiving the facsimile signal formed by the circuitry depicted in the block diagram of FIG. 4. Reference numeral 30 indicates an input terminal; 31 and 32 designate gates for dividing the input signal into odd-numbered lines and even-numbered lines, as is the case of the gates 2 and 3 in FIG. 4; 33 identifies a run length decoding circuit for decoding the odd-numbered line signal rendered in the run length code; 34 and 35 denote shift registers, each storing the decoded odd-numbered line signal of one line; 36 represents a counter for counting the number of shifts in the shift register 34; 37 shows a coincidence circuit for checking whether or not the reference picture elements are coincident with each other, as is the case of the coincidence circuit 7 in FIG. 4; 38 and 39 refer to gates which open in the cases of the areas A and B, respectively; 40 indicates a NOT circuit; 41 designates a variable length decoding circuit by which the code rendered by the variable length coding circuit 16 in FIG. 4 into the variable length is reversely converted into the original equal-length codes; 42 identifies a pulse generator which applies pulses corresponding in number to the value obtained by the variable length decoding circuit 41 to a gate 43, and thereafter applies one pulse to a gate 44; 45 denotes a NOT circuit; 46 represents a memory for storing the picture element information of the decoded even-numbered line; 47 shows an identification circuit by which the even-numbered line signal applied thereto from the input terminal 0 through the gate 32 is divided into codes of the areas A and B in accordance with the identification codes included in the even-numbered line signal, the former being applied to a memory 48 and the latter to a memory 49; 50 refers to a memory for storing the output from the shift register 35, that is, the information of one odd-numbered line; 51 indicates an OR circuit; 52 designates an output terminal; and 53 identifies a flip-flop circuit which operates with pulses derived from the counter 36 at each line.

The operation of the circuitry shown in the block diagram of FIG. 5 is as follows:

The received signal from a transmission line is applied to the gates 31 and 32 through the input terminal 30. Since these gates are alternately opened at each line by the operation of the flip-flop 53 described later, the odd-numbered line signal is sent to the run length decoding circuit 33 and the even-numbered line signal is sent to the identification circuit 47. The odd-numbered line signal is decoded by the run length decoding circuit 33 and its picture element information of one line is stored in the shift register 34, and the picture element information of the odd-numbered line immediately preceding it is stored in the shift register 35. When the reference line information has thus been stored in the shift registers 34 and 35, the shift registers 34 and 35 are successively shifted by the same operation as the coincidence circuit 7 in FIG. 4 and in the case of the area A, the gate 38 is opened and, in the case of the area B, the gate 39 is opened. On the other hand, the even-numbered line signal is divided into signals of the areas A and B by the detection of the identification codes of FIG. 3A in the identification circuit 47, which signals are stored in the memories 48 and 49, respectively. As a result of this, when the area is A, the coded signal of the area A is sent through the gate 38 to the variable length decoding circuit 41 for conversion into the original equal-length code. This value is a distance between the mispredicted picture elements described previously in connection with FIG. 2. While receiving pulses from the coincidence circuit 37, the pulse generator 42 successively applies pulses corresponding in number to the abovesaid value to the gate 43. Upon opening of the gate 43, the output from the shift register 34, that is, the reference picture element information of the coded picture elements, is stored in the memory 46. Upon stopping of the supply of pulses from the pulse generator 42 to the gate 43, since the next picture element is the mispredicted picture element, the pulse generator 42 sends one pulse to the gate 44 to open it, permitting inverted information of the reference information to be stored in the memory 46 through the NOT circuit 45.

In the absence of the output pulse from the coincidence circuit 37, the operation of the pulse generator 42 is once stopped (This pulse generator 37 resumes its operation when the coincidence circuit produces the output pulse.). At this time, the gate 39 openes, so that the information in the memory 49, that is, the picture element information in the area B, is stored element by element in the memory 46. In this way, the information of the even-numbered line is decoded and stored in the memory 46, thereafter being derived at the output terminal 52 through the OR circuit 51.

On the other hand, since the information of the odd-numbered line is sent to the OR circuit 51 after being once stored in the memory 50, reverse conversion of such line rearrangement as shown in FIG. 2, performed at the transmitting side, is achieved to provide the facsimile picture signals of the correct order at the output terminal 52.

The decoding of each line is completed at the time when the contents of the shift register 34 has been shifted by one line, and the completion of decoding is detected by the counter 36. That is, the counter 36 counts the number of shifting times of the shift register 34, and when the count value becomes equal to the known number of picture elements in one line, the counter 36 applies a pulse to the flip-flop 53 so that the contents of the counter 36 is reset to the state 0. Since the flip-flop 53 is supplied with the pulse at each line, the gates 31 and 32 are alternately opened at each line.

The method described above is one which employs the run length coding method every other line and the abovesaid novel coding method for the other remaining lines. However, it is also possible to use all the methods other than the run coding method, that is, known coding methods which perform processing at each line such, for instance, as a method for information change picture elements in facsimile signal, an ordinary two-dimensional predictive coding method, etc. These methods can be realized, for example, by changing the run length coding circuit 19 in FIG. 4 and the run length decoding circuit 33 in FIG. 5 to an information change picture element address coding circuit and a decoding circuit corresponding thereto, respectively. Further, it is also possible to combine the lines of the group I in pairs and apply the facsimile signal of such a group I to a run length coding method of a plurality of scanning lines which has also been proposed (Japanese Patent Laid-Open No. 48917/76). Namely, various decoding methods are applicable to the group I.

In the above, the facsimile signal in the group II is coded after being divided into the areas A and B, and the picture element in the area A is subjected to dimensional prediction using the two picture elements above and below it as the reference picture elements, and the address of the mispredicted picture element is represented with the distance (the number of picture elements) between it and the immediately preceding mispredicted picture element, but it is also possible to increase the number of reference picture elements for the two-dimensional prediction. For example, the picture element immediately preceding the picture element to be coded and those of left and right sides of the upper and lower picture elements can also be selected as the reference picture elements.

This two-dimensional predictive coding method is also applicable to both of the areas A and B, i.e all of the lines of the group II. In a case where the line of the group II is classified into the areas A and B and the abovesaid two-dimensional predictive coding method is applied to only the area A, since almost of the mispredicted picture elements are usually adjacent to the boundary (i.e. the boundary between a certain area and the next subsequent one), the addresses of the mispredicted picture elements can also be coded in the following manner.

In a case where the mispredicted picture element to be coded is adjacent to the boundary, (1) the number of the area A lying between the mispredicted picture element to be coded and the immediately preceding mispredicted picture element, and the information indicative of the side of the boundary of the area A including the mispredicted picture element to be coded to which this mispredicted picture element is adjacent, or (2) the number of boundaries lying between the mispredicted picture element to be coded and the immediately preceding mispredicted picture element and, if necessary, the information indicative of whether the boundary to which the picture element is adjacent is at the right or left of the picture element (This information is necessary for the picture element $E_1$ in the example of FIG. 2 but if the picture element F in FIG. 2 is white, it becomes a mispredicted picture element and the above information is unnecessary for this picture element F) are coded. In a case where the mispredicted picture element does not adjoin the boundary, it is also possible to code, for example, the number of boundaries between the boundary nearest the mispredicted picture element to be coded and the immediately preceding mispredicted picture element, and the number of picture elements between the boundary and the mispredicted picture element to be coded and the direction of the former relative to the latter.

For example, in the case of picture element $E_1$ in FIG. 2, the area including the picture element $E_1$ is preceded by two areas A and this picture element adjoins the right-hand boundary of the third area A, so that the address of the picture element E can be represented, for example, as follows:

"010_0_" (The underline indicates that this picture element adjoins the right-hand boundary of the area A.)

in accordance with Table 1. In a case where the picture element $E_1$ is not adjacent to the boundary, for instance, the code, which is the maximum number (the number of picture elements of one line) plus one in FIG. 1, is used to indicate that the picture element is not adjacent to the boundary. Moreover, the left-hand boundary nearest the picture element $E_1$ is indicated by the abovesaid method and, further, the number of picture elements between this boundary and the picture element $E_1$ is coded, for instance, in accordance with Table 1.

Alternatively, the address of the picture element $E_1$ in FIG. 2 can also be represented as follows:

"100000_0_" (The underline indicates that the boundary which this picture element adjoins is at the right side thereof.)

in accordance with Table 1, since the picture element $E_1$ is preceded by four boundaries and since the boundary which the picture element $E_1$ adjoins is on the right side thereof.

As regards the signal of the area B, for example, the convertional run length coding method may also be applied on the assumption that the signals in the area are each continuous to the preceding one. Further, for instance in a case where the area B includes three or more picture elements, a code of a length corresponding to the probability of appearance of the information pattern of the three picture elements to be coded can also be assinged in accordance with the reference picture element pattern for the three picture elements to be coded. For example, when the area B has a length of three picture elements, it is possible to assign a code corresponding to the probability of appearance of each pattern such as shown in Table 2.

Table 2

| Reference picture element | Three picture element pattern | Code to be Assigned |
|---|---|---|
| 000 | 000 | 00 |
| *** | 001 | 100 |
| 111 | 010 | 1110 |
|  | 011 | 1100 |
|  | 100 | 101 |
|  | 101 | 1111 |
|  | 110 | 1101 |
|  | 111 | 01 |

The separation of the areas A and B can also be effected, for example, by the following method other than the above described one. Namely, the area A are each defined to include one picture element at each side of the area and the other remaining areas are the area B. This may decrease the number of mispredicted picture elements in the area A and further reduces the number of code bits in some cases.

In the above, the facsimile signal of the group II is coded line by line, but may be coded for two or more lines at one time in the following manner. This is such a method as shown, for example, in FIG. 7A, in which the reference lines for the line of the group II, for instance, #2, are the lines #1 and #4 and the reference lines for the line #3 are lines #2 (which may also be replaced by the line #1) and #4 since the line #2 is known. Similarly, the reference lines for the line #5 are lines #4 and #7 and the reference lines #6 are the lines #5 (which may also be replaced by the line #4) and #7.

Figure 7A:
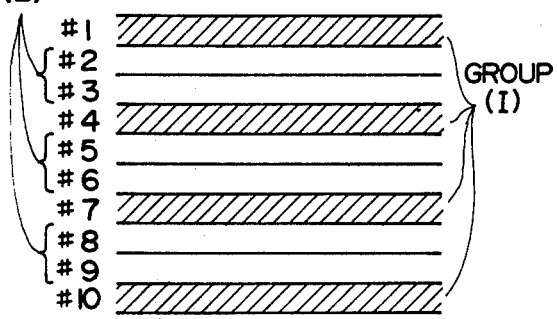
Figure 8:
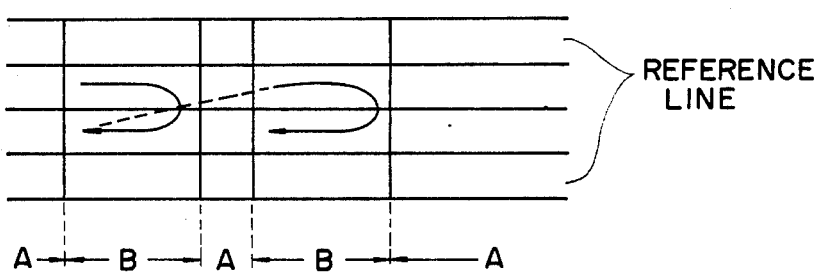
FIG. 8 is a diagram explanatory of coding of a second region (B) in this invention.

Moreover, the signal of the group II may also be coded by the following method. That is, for instance, in the example of FIG. 7A, the lines #2 and #3 are combined and the lines #1 and #4 are handled as the reference information as described above. In the case of indicating the address of the mispredicted picture element of the area A, the information representative of whether the picture element is included at the line #2 or #3 is also coded at the same time. Further, the picture elements of the area B are sent as they are, or subject to the run length coding on the assumption that the area B is continuous as depicted in FIG. 8.

Figure 7B:
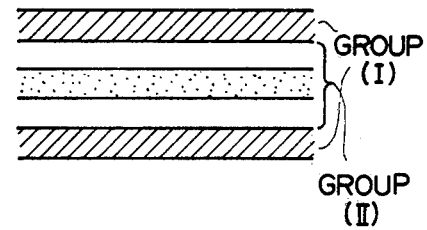

Another coding method of the signal of the group II (which is also related to the group I) is such as shown in FIG. 7B. At first, the lines #1 and #5 are combined as the group I and the line #3 is coded using the lines #1 and #5 as the reference information in accordance with any one of the abovesaid coding methods of the group II and the lines #2 and #4 are coded using, as the reference information therefor, the lines #1 and #3 and the lines #3 and #5, respectively, under the same coding method.

It is also possible, of course, to employ the abovesaid methods in combination.

In the coding of the signal of the group II, any of the abovesaid methods can be realized by the use of circuits substantially identical with those depicted in FIGS. 4 and 5.

Figure 9:
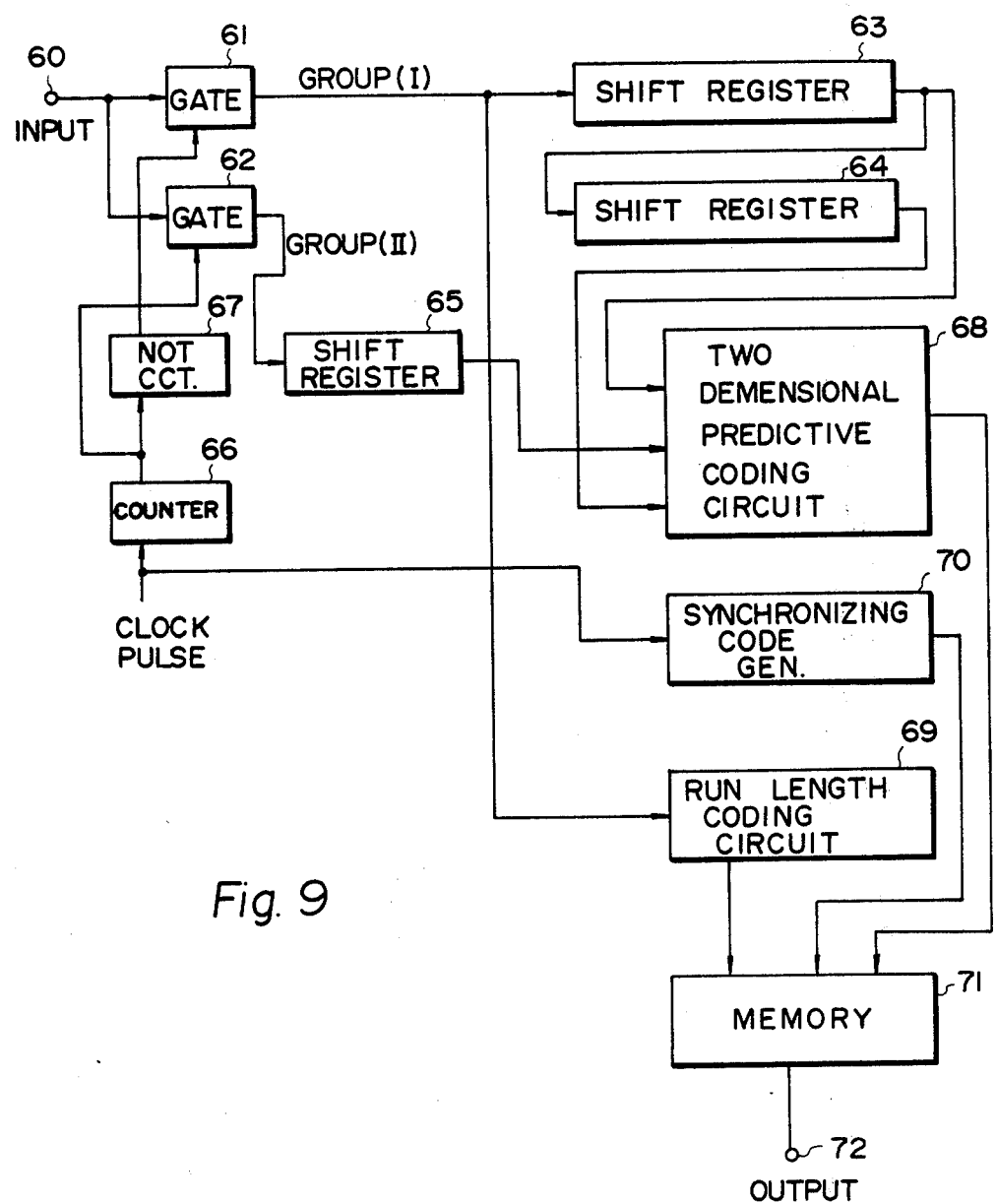

FIG. 9 is a block diagram illustrating an embodiment of this invention in which the lines of the group I are coded in pairs in accordance with the run length coding method of a plurality of scanning lines while the lines of the group II are coded in accordance with the two-dimensional predictive coding method. In FIG. 9, reference numeral 60 indicates an input terminal; 61 designates a gate which permits the passage therethrough of only those of the group I in the facsimile signals applied from the input terminal 60; 62 identifies a gate which permits the passage therethrough of only the signals of the group II; 63 and 64 denote shift registers for storing facsimile signals of two and one line, respectively; 65 represents a shift register for storing facsimile signals of one line of the group II; 66 shows a counter which counts from "0" to "2" and produces an output when the count value is "2"; 67 refers to a NOT circuit; 68 indicates a two-dimensional predictive coding circuit by which the information of one line of the group II stored in the shift register 65 is coded in accordance with the two-dimensional predictive coding method, using as the reference information, the information of each line of the group I stored in the shift registers 63 and 64; 69 designates a run length coding circuit for a plurality of scanning lines for coding the signal of the group I; 70 identifies a synchronizing code generator for generating synchronizing codes which are each inserted between the signals of the groups I and II to be coded; 71 denotes a memory; and 72 represents an output terminal.

The operation of the circuitry of FIG. 9 is as follows: The counter 66 is supplied with a clock pulse for each line of the facsimile signal, and repeatedly counts the number of clock pulses from "0" to "2". Only when the count value of the counter 66 is "2", the output from the counter 66 is turned ON, so that the gate 61 opens only when the count value of the counter 66 is "0" and "1", and the gate 62 opens only when the count value of the counter 66 is "2". As a result of this, the signal of the group I is applied to the shift register 63 and the run length coding circuit 69 through the gate 61 while the signal of the group II is applied to the shift register 65 through the gate 62.

The signal of the group I is immediately coded in the coding circuit 69 in accordance with the run length coding method of a plurality of scanning lines and the coded output is supplied to the memory 71. At this time, the signal of the line of the group I is also sent to the shift register 63. When the signal of one line of the group II has been stored in the shift register 65, since the shift registers 63 and 64 have capacities of two and one line, respectively, these shift registers 63 and 64 derive from their outputs information of the lines immediately succeeding and preceding the line stored in the shift register 65. Thus, the two-dimensional predictive coding circuit 68 is supplied with the information of the line to be coded from the shift register 65 and the information of the lines immediately before and after the above line from the shift registers 64 and 63 as the reference information. The coding circuit 68 is a two-dimensional predictive coding circuit which employs two reference lines, and the coded output therefrom is stored in the memory 71.

The synchronizing code for the line synchronization is formed by the synchronizing code generator 70 and is also stored in the memory 71. The results of coding of the facsimile signal and the synchronizing codes SD stored in the memory 71 are delivered out to the output terminal 72, for example, in such an order as depicted in FIG. 3. If the two-dimensional predictive coding circuit 68 in FIG. 9 is replaced by other circuits, for example, the coincidence circuit 7 to memories 17 and 18 shown in FIG. 4, the line of the group II can be coded by other methods.

Figure 10:
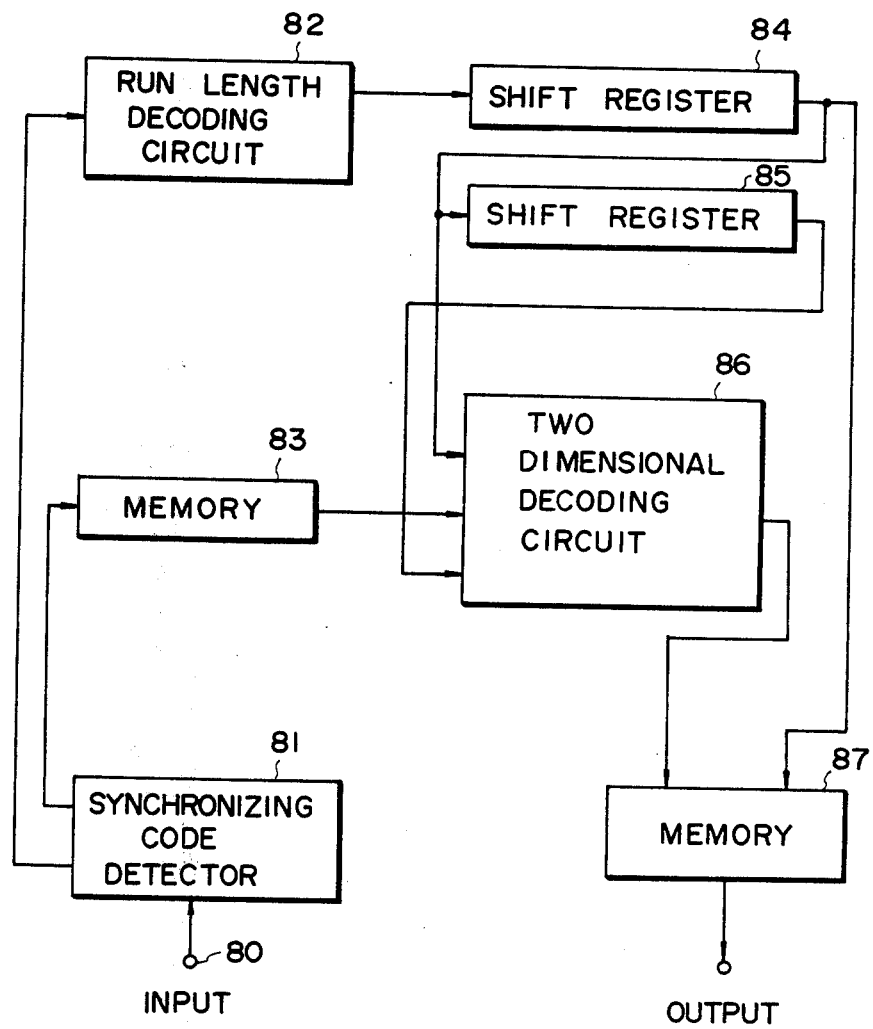

FIG. 10 shows an example of the circuit for performing reverse conversion of the codes from the circuitry of FIG. 9. In FIG. 10, reference numeral 80 indicates an input terminal; 81 designates a synchronizing code detector for detecting the synchronizing codes from the received facsimile signal to separate the signals of the groups I and II from each other; 82 identifies a run length decoding circuit of a plurality of scanning lines for achieving reverse conversion of the codes from the coding circuit 69 in FIG. 9; 83 denotes a memory for storing the coded signal of the group II of one line; 84 and 85 represent shift registers for storing signals of two and one line, respectively; 86 shows a two-dimensional predictive decoding circuit for performing reverse conversion of the code from the coding circuit 68 in FIG. 9; 87 refers to a memory; and 88 indicates an output terminal.

In FIG. 10, the received facsimile signal is supplied through the input terminal 80 to the synchronizing code detector 81, in which the synchronizing codes in the facsimile signal are detected. By the detection of the synchronizing code, the detector 81 separates the signals of the groups I and II from each other and sends the former to the run length decoding circuit 82 and the latter to the memory 83. The signal of the group I is sent to the shift register 84 after being decoded in the decoding circuit 82. As is the case with the circuit shown in FIG. 9, the two-dimensional predictive coding circuit 86 is supplied with the signal of the group II to be coded from the memory 83 and the signals of reference lines from the shift registers 84 and 85. The result of decoding is once stored in the memory 87 along with the output from the shift register 84, i.e. the signal of the group I and then sent to the output terminal 88 in the same order as that of reading at the transmitting side.

Figure 11:
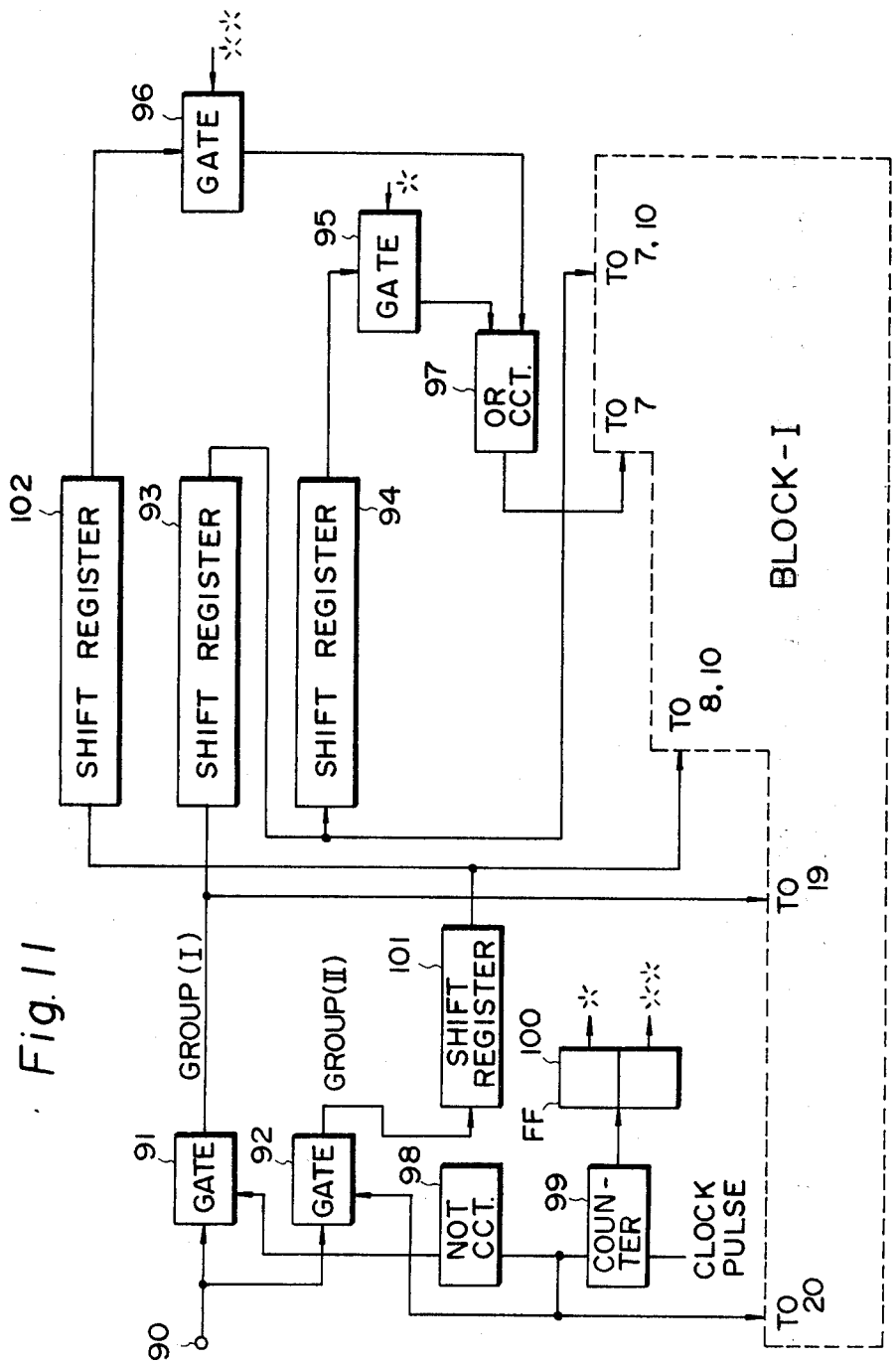

FIG. 11 is a block diagram illustrating an embodiment, in which the signal of the group I is coded line by line in accordance with the run length coding method while the lines of the group II are coded in pairs. In FIG. 11, reference numeral 90 indicates an input terminal; 91 and 92 designate gates for separating the signals of the groups I and II from each other, 93 and 94 identify shift registers, each for storing the signal of the group I of one line; 95 and 96 denote gates; 97 represents an OR circuit; 98 shows a NOT circuit; 9 shows a counter; 100 refers to an SR type flip-flop; and 101 and 102 indicate shift registers, each for storing the signal of the group II of one line. A broken-line block I is identical with that in FIG. 4.

The operation of the circuitry shown in the block diagram of FIG. 11 is as follows: the counter 99 is one which counts from "0" to "2" and is updated at each line. When the count value of the counter 99 is "0", the counter applies its output to the NOT circuit 98 and the gate 91. With the result that the gate 91 opens but the gate 92 has reached "1" or "2", the gate 92 opens but the gate 91 remains closed. When the count value of the counter 99 is "1" or "2", the counter 99 applies a pulse to the flip-flop 100, so that the outputs * and ** from the flip-flop 100 turn ON to open the gates 95 and 96 when the count value of the counter 99 is "1" and "2".

Thus, the signal of the group I shown in FIG. 7A is sent to the shift register 93 and the signal of the group II is sent to the shift register 101. The signal of one line stored in the shift register 101 is sent to the shift register 102 and, at the same time, applied to the circuitry of the broken line block for the coding described previously with regard to FIG. 4. In this case, however, the reference information used for this coding is derived from the shift registers 94 and 93 (the output signals from these shift registers are both the signals of the group I) when the gate 95 is open, that is, in the case of coding a first one of the lines of the group II and, derived from the shift registers 102 and 93 (the former output signal being the signal of the group II and coded immediately before it is derived from the shift register and the latter being the signal of the group I) when a second one of the lines of the group II is coded. It is also possible, of course, to code the lines of the group II by some other coding method by replacing the circuitry of the broken line block in FIG. 11 by, for instance, the two-dimensional predictive coding circuit 68.

FIG. 12 illustrates in block form an example of the structure for receiving the signal formed by the circuitry depicted in FIG. 11. In FIG. 12, reference numeral 110 indicates an input terminal; 111 designates a synchronizing code detector for detecting the synchronizing codes in the received facsimile signal to separate the signals of the groups I and II from each other; 112 identifies a counter which receives a pulse at each detection of the synchronizing code by the synchronizing code detector 111 to count the pulses in the range of "0" to "2", and turns ON the output * when the count value is "1", i.e. in the case of the first line of the signal of the group II, and turns ON the output ** when the count value is "2", i.e. in the case of the second line of the signal of the group II; 113 identifies a run length decoding circuit for decoding the signal of the group I; 114 and 115 denote shift registers, each for storing one line of the decoded signal of the group I, 116 and 117 represent gates; and 118 shows an OR circuit. A circuit block II surrounded by the broken line is identical with the broken line block II in FIG. 5.

The operation of the circuit shown in FIG. 12 is as follows:

The received facsimile signal is separated into signals of the group I and II by the detection of the synchronizing codes in the synchronizing code detector 111, the former being sent to the run length decoding circuit 113 and the latter being sent to the identification circuit 47 or FIG. 5. The signal of the group I is decoded by the run length decoding circuit 113 into the original signal, which is stored in the shift register 114. The signal of the group I immediately preceding the abovesaid signal, stored in the shift register 114, is transferred to the shift register 115. Thereafter, the signal of the first line of the signal of the group II is applied through the synchronzing code detector 111 to the identification circuit 47 and the stages following it and decoded by the same operations as in the example of FIG. 5. The reference information used in this case is the information from the shift register 114, that is, the signal of the group I two line after the first line of the group II to be decoded, and the output from the shift register 115, that is, the information of the line of the group I immediately preceding the first line of the group II to be decoded because the output * of the counter 112 turns ON to open the gate 116. Upon completion of decoding of the first line of the group II, decoding of the second line of the group II takes place and the reference information used therefor is the information from the shift register 114 and the contents of the memory 46, that is, the information of the first line of the group II whose decoding is completed immediately before this decoding, since the output ** of the counter 102 turns ON to open the gate 117. In this manner, the information of the lines of the groups I and II is repeatedly decoded in the successive order.

FIGS. 9 and 10 show the case which uses the group I at the rate of two lines and the group II at the rate of one line, and FIGS. 11 and 12 the case which uses the group I at the rate of one line and the group II at the rate of two lines. The combined use of these methods is of course possible. Further, it is also possible to realize the aforementioned method of using group I or II at the rate of three or more lines by the employment of circuitry similar to those depicted in FIGS. 9 to 12.

With the methods described above, the original signal is precisely coded as it is but it is also possible to apply any one of the above described methods after the original signal is a little converted as will be described hereunder. Namely, in the foregoing, the signal of the area A is subjected to predictive coding and the mispredicted picture element is coded and transmitted but, in the following method, the address of the mispredicted is not sent to the receiving side and, at the receiving side, the received signal is recorded on the assumption that the predicted picture elements are all correctly predicted. In other words, the mispredicted picture elements such as those $E_1$ and $E_2$ in FIG. 2 are eliminated at the transmitting side. Such processing does not involve the transmission of the address information of the mispredicted picture element, and hence remarkably reduces the number of bits to be sent to extremely shorten the transmission time. Further, the influence of this processing upon the received picture quality cannot be recognized by the naked eye and the processing may sometimes enhance the picture quality, for example, in the case of a vertical straight line or the like. This processing can be realized with such a simple circuit construction, which does not require the gate 8 and the coincidence circuit 11 to the memory 17 in FIG. 4 and the gate 38, the variable length coding circuit 41, the pulse generator 42, the gate 44, the NOT circuit 45, the identification circuit 47 and the memory 48 in FIG. 5, and in which the gate 32 and the memory 49 are directly interconnected to each other and the gate 43 is opened and closed by the output from the coincidence circuit 37. In this case, the indentification codes ID shown in FIG. 3A are unnecessary.

The above is the method which does not deliver out the information of the area A to the transmission line. With this method, however, for example, very thin horizontal lines may disappear to deteriorate the received picture quality in some cases. Then, the deterioration of the received picture quality can be alleviated by sending out one portion of the information of the area A to the transmission line as will be described hereunder. In other words, the information of the area A is converted, for instance, in the manner described hereinbelow, and then subjected to the abovesaid predictive coding to code the address of the mispredicted picture element. That is, the run length of those of the picture elements of the area A which have information different from that of their reference picture elements is checked and the information of only the picture elements the run of which is less than a predetermined number $\underline{x}$ (for example, "2", "3" or "4") is inverted. FIG. 13 shows an example of this method. FIG. 13A shows the information before it is converted and FIG. 13B the information after converted. In the illustrated example, the area A is one; the information of the reference picture element for this area A is white; the number of information of the area A which is different from that of the reference picture element, that is, the runs of the black are three as indicated by $R_1$, $R_2$ and $R_3$, which have run lengths of "3", "2" and "1", respectively. In the above conversion, for instance, if $x = $ "2", the run $R_1$ remains unchanged but the runs $R_2$ and $R_3$ are inverted, obtaining such a result as shown in FIG. 13B.

Figure 14:
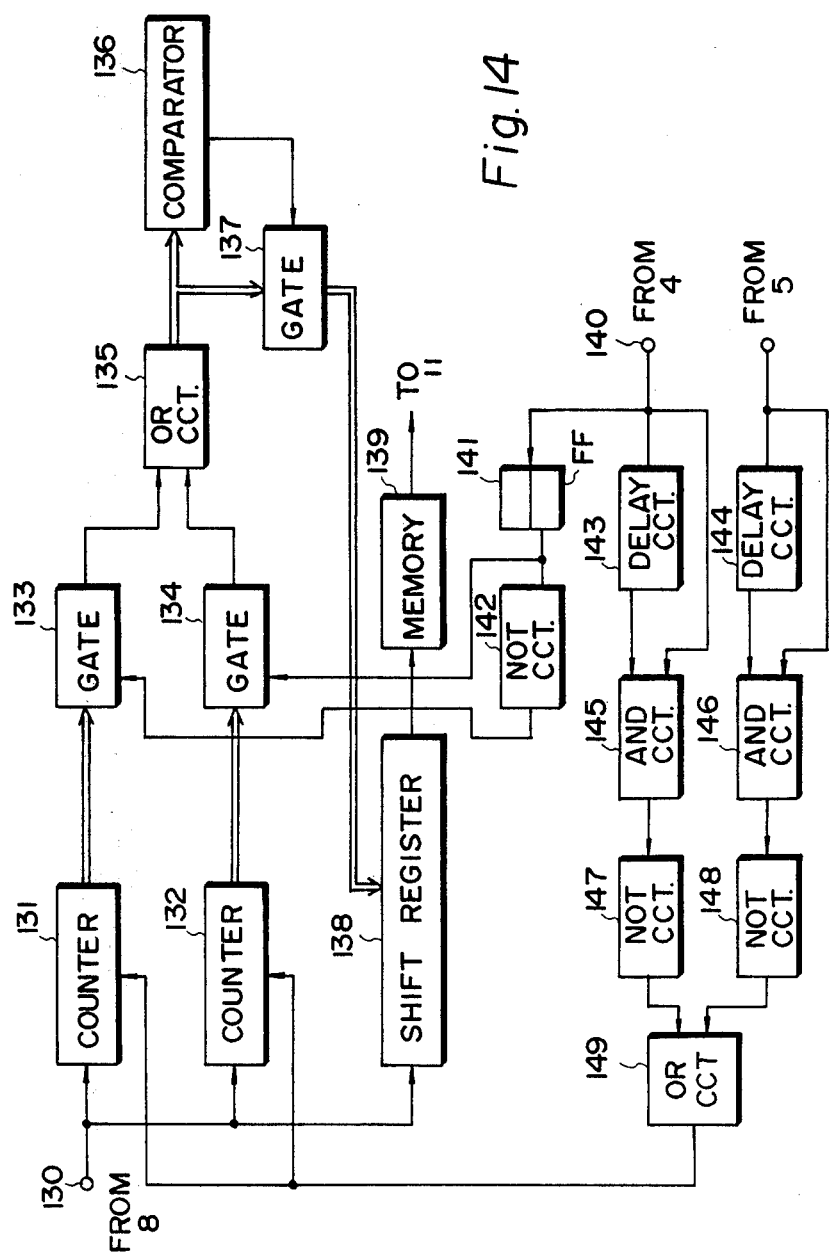

With the abovesaid conversion processing, deterioration of the received picture quality can be alleviated. FIG. 14 is a block diagram illustrating an example of the conversion processing. In FIG. 14, reference numeral 130 indicates an input terminal for receiving the signal of the area A from the gate 8 in FIG. 4; 131 and 132 designate counters for counting the run lengths of white and black runs of the facsimile signal derived from the input terminal 130, respectively; 133 and 134 identify gates; 135 denotes an OR circuit; 136 represents a comparator which compares the value obtained from the OR circuit 135 and a predetermined number $\underline{x}$ with each other, and applies a pulse to a gate 137 described later when the former value is smaller than the latter; 137 shows the abovesaid gate; 138 refers to a shift register of $(x + 1)$ bits; 139 indicates a memory for storing the signal of the area A after it is converted; 140 designates an input terminal for receiving the reference picture element information from the shift register 4 of FIG. 4; 141 identifies a flip-flop; 142 denotes a NOT circuit; 143 and 144 represent delay circuits; 145 and 146 show AND circuits; 147 and 148 refer to NOT circuits; and 149 indicates an OR circuit.

The operation of the circuitry of FIG. 14 and its relationship to the operation of the circuitry of FIG. 4 are as follows: The circuitry composed of the delay circuit 143 to the OR circuit 149 is a circuit which produces a pulse at each boundary of the areas. Namely, the delay circuit 143, the AND circuit 145 and the NOT circuit 147 compare each picture element with the immediately preceding one in the shift register 4 (the information of the reference line immediately succeeding to the line to be coded) to detect the element of change information. Similarly, the delay circuit 144, the AND circuit 146 and the NOT circuit 148 detect the picture element of changed information in the shift register 5 (the information of the reference line immediately preceding the line to be coded). Consequently, the OR circuit 149 produces a pulse at each boundary of the areas of the line to be coded.

On the other hand, the run length of the signal of the area A is counted by counters 131 and 132 respectively detecting the white and black run lengths. Since counting of these circuits 131 and 132 is reset at each application of the pulse from the OR circuit 149, the counters 131 and 132 respectively derive therefrom the run lengths in each area A. In other words, the counters do not count the run lengths additively to the information of the adjoining area A. When the reference picture element information is white, that is, in the case of the area A which does not produce any output from the shift register 4, the gate 133 remains closed but the gate 134 opens, so that black run length information is applied to the comparator 136. Conversely, in the case of the area A of black reference picture element information, the gate 133 opens to apply white run length information to the comparator 136. These run lengths are each compared with the predetermined value $\underline{x}$ in the comparator 136. If the value $\underline{x}$ is larger than the value of the run length, the comparator 136 produces a pulse, so that the gate 137 opens to apply the run length value to the shift register 138. The shift register 138 stores therein information of $(x + 1)$ picture element and inverts the information of those of the stored picture elements, which are equal in number to the numerical value supplied from the gate 137. FIG. 15 shows the manner of this inversion in the case of $x = 5$. In FIG. 15, the shift register 138 is a 6-bit one. For instance, if the number applied from the gate 137 is "3", the information of three successive bits except the first bit is inverted, as shown. That is, the abovesaid conversion processing takes place. As a result of this, the information of the area A after being converted, as described above, is stored in the memory 139.

The circuit of FIG. 14 is one for effecting the conversion shown in FIG. 13. With the addition of the circuit of FIG. 14 to that of FIG. 4, the picture element information of the area A is once subjected to required conversion processing, and then the converted information of the area A (the memory 139) is applied to the coincidence circuit 11 and the circuits following it in FIG. 4, by which the predictive coding is achieved. Since the shift registers 4 and 5 are required to stored therein the reference information at this time, it is necessary not to eliminate the contents of the shift registers 4 and 5 but to write the contents again in the shift registers 4 and 5 in the case of performing the conversion processing of FIG. 13. In the example shown in FIG. 14, the signal of the area A is previously processed for conversion and then subjected to the predictive coding. However, it is also possible to carry out both of the conversion processing and the predictive coding at the same time and perform the predictive coding of those picture elements of the signal of the area A which have not been subjected to the conversion (inversion) processing.

Further, the following conversion processing is also possible. For instance, in the example of the facsimile signal shown in FIG. 13A, there does not exist on the reference line any black run adjoining the black run $R_2$, and only such an isolated run is inverted. Moreover, it is also possible to use a method of inverting only those of such isolated runs whose lengths are less than a predetermined value.

The above relates to the conversion operation in the area A, but the coding efficiency in the area B can be also improved without deterioration of picture quality. In such a method, the length of the area B is counted at the sending side, so that only the length of the area B more than a constant value $\underline{y}$ is transmitted. Since the length of the area B less than the constant value $\underline{y}$ is not transmitted, the length of the area B of this case is known at the receiving side with respect to the address information of the reference picture element. Moreover, the area B of this case is decided and supplemented as white or black in accordance with information of picture elements adjacent to the area B.

Figure 17:
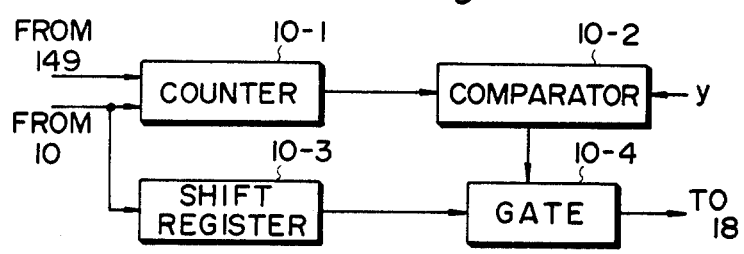
FIG. 17 is a block diagram explanatory of a modification of the embodiment shown in FIG. 4.

FIG. 17 is an embodiment of this invention designed for performing the above operation, in which a counter 10-1, a comparator 10-2, a shift register 10-3 and a gate 10-4 are further provided between the gate 10 and the memory 18 in the embodiment shown in FIG. 4 after adding the circuitry shown in FIG. 14 between the gate 8 and the coincidence circuit 11. The operation of this embodiment of FIG. 17 is as follows: The boundary between areas is detected by a circuit block comprising the delay circuits 143 and 144, the AND gates 145 and 146, the NOT circuits 147 and 148 and the OR gate 149 in the same manner as FIG. 14, so that the length of the area B is counted by the counter 10-1 which receives the output of above circuit block and the gate 10. The counted output of the counter 10-1 is compared with the constant value $\underline{y}$ in the comparator 10-2, which generates an output and applys it to the gate 10-4 when the counted output of the counter 10-1 exceeds the constant value $\underline{y}$. On the other hand, the information of the area B is applied from the gate 10 to the shift register 10-3 of y-bits, so that the output bits of the register 10-3 are applied through the gate 10-4 to the memory 18 only when the gate 10-4 is opened as mentioned above. In a case where the counted output of the counter 10-1 is less than the constant value $\underline{y}$, the information of the area B is abandoned since the gate is still closed.

Figure 18:
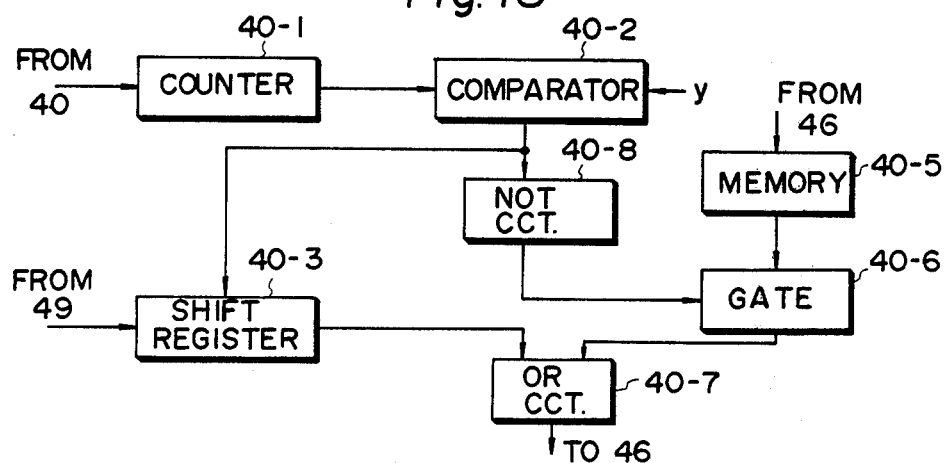
FIG. 18 is a block diagram explanatory of a modification of the example shown in FIG. 5.

FIG. 18 is a modification of a part of the example shown in FIG. 5 to form an example of a decoding circuit for decoding the signal generated from the circuit shown in FIG. 17. A counter 40-1, a comparator 40-2, a shift register 40-3, a memory 40-5, a gate 40-6, a OR gate 40-7 and a NOT circuit 40-8 are replaced in place of the gate 39 in FIG. 5. The operation of the example shown in FIG. 18 is as follows: The output of the NOT circuit 40 is counted by the counter 40-1, and the counted output of the counter 40-1 is compared with the constant value $\underline{y}$ at the comparator 40-2. The aforementioned information to be supplemented is stored in the memory 40-5. The contents of the memory 40-5 are, for example, picture elements immediately preceding to the instant area B. On the other hand, the information of the instant area B is stored in the shift register 40-3 of y-bits. Since the counted output of the counter 40-1 is less than the constant value $\underline{y}$, the gate 40-6 is opened through the NOT circuit 40-8 during the duration of the instant area B so that the contents of the memory 40-5 are applied to the OR gate 40-7 to supplement the abandoned information of the sending side at the memory 46. However, when the counted output of the counter 40-1 exceeds the constant value $\underline{y}$, the contents of the shift register 40-3 are applied through the OR gate 40-7 to the memory 46. Other operations are the same as those in FIG. 5.

In a case of inserting a special signal indicative of the termination of the area A or the area B into the input facsimile signal, the last information of each area A or B is not essentially be coded. In the above mentioned method, in which an area A having a run length less than the constant value $\underline{x}$ is decided as true prediction picture elements to invert its porality, the number of successive false prediction picture elements is always more than the constant value $\underline{x}$. If a code pattern (e.g. 000000) corresponding to the above length is decided as the last signal of the instant area A to be coded, the last signal of the area A can be removed.

Figure 19:
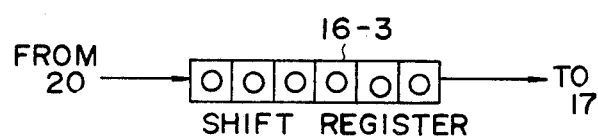
FIG. 19 is a block diagram explanatory of another modification of the embodiment shown in FIG. 4.

The above operation can be performed by adding a shift register 16-3 of FIG. 19 between the pulse generator 20 and the memory 17 in the embodiment shown in FIG. 4. In this case, the shift register 16-3 shifts the output pulses from the pulse generator 20 at the termination of the area A, so that the special signal of 000000 is applied to the memory 17 and stored in the memory 17 in place of the last variable length code.

Figure 20:
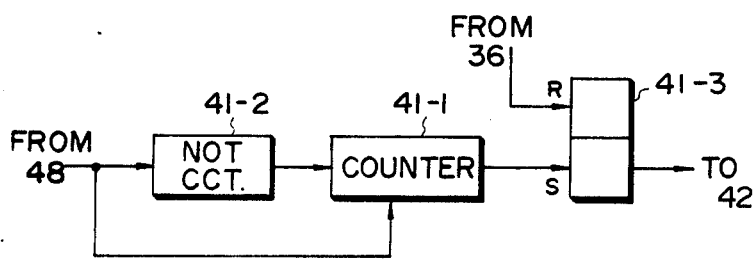
FIG. 20 is a block diagram explanatory of another modification of the example shown in FIG. 5.

FIG. 20 is an example of an addition part in FIG. 5 for reverse conversion of the output signal generated from the embodiment described with reference to FIG. 19. The special signal of 000000 is detected from the contents of the memory 48 by a NOT circuit 41-2 and a counter 41-1. The counter 41-1 is reset to the state "0" by the signal "0" from the memory 48 and counts the signal of state "1" from the NOT circuit 41-2. The carry of the counter 41-1 is generated for six pulses from the NOT circuit 41-2 to set a flip-flop circuit 41-3, so that the pulse generator 42 starts to generate pulses. The flip-flop circuit 41-3 is reset by the output of the counter 36, so that the pulse generator 42 stops to generate pulses. As a result of the above operation, the last information of the area A is restored and stored in the memory 46.

It is also possible to adopt a method of inverting only such a run which has a run of the same information adjacent thereto on one of the reference lines. The various methods described above can be used in combination.

Next, a description will be given with regard to alleviation of the influence of a transmission error in the case of employing this invention. In a case where a transmission error occurs and no correction is made by the request repeat system, the error has the following influence upon the received picture elements in the cases of using the abovesaid coding methods. Let it be assumed that the lines of the group II are coded by the run length coding method, for example, in the example of FIG. 1. If the coded signal of the line #3 is incorrectly received, it affects the line #4 but does not exert any influence upon the other lines. In a case where the coded signal of the line #4 is incorrectly received, its influence is confined in the line. Thus, an incorrect reception of the signal of the group I exerts an influence upon the lines of the group II. This influence on the received picture quality is dependent upon the number of lines of the group II, but does not generally lead to remarked degradation of the picture quality. In the case of a document on which small characters are written with high density, however, the document is hard to read in some cases, so that a method of changing the number of lines of the group II in accordance with the amount of information is effective. That is, when the number of bits of the line of the group I to be coded is larger than a first threshold value (1000 bits, for example), it is decided that the amount of information of the next line of the group II is large, and then the next line is also included in the group I and subjected to the run length coding, as depicted in FIG. 16. In a case where the number of bits to be coded is smaller than the first threshold value but larger than a second threshold value (500 bits, for instance), the number of lines of the group II is selected to be one. If the number of bits to be coded is less than the second threshold value, the number of lines of the group II is selected to be two or so. With the method of varying the number of lines of the group II in accordance with the amount of information as described above, it is possible to remarkably lessen the influence of a transmission error on the received picture quality without achieving the correction. In the above, the number of lines of the group II is altered but the number of lines of the group I may also be changed in a likewise manner.

As has been described in detail in the foregoing, the method of this invention is such a method, in which the lines of a facsimile signal are divided into the groups I and II, signals of the group I are coded by a known method and signals of the group II are each subjected to predictive coding using, as reference information, the signals of the group I just above and below the signal of the group II. Consequently, this invention has the advantages that the number of bits necessary for coding the signals of the group II is much reduced to remarkably shorten the transmission time and effectively suppress the influence of a transmission error on the received picture quality.

What we claim is:

1. A method for interline-coding a facsimile signal comprising the steps of:
    alternately dividing information of scanning lines of an input facsimile signal into information of at least one first unit line and information of at least one second unit line;
    first coding information of a first one of said first unit lines in accordance with a predetermined coding principle;
    secondly coding the information of the next one of said first unit lines in accordance with a predetermined coding principle prior to coding of information of said first one of said second unit lines; and
    thirdly coding information of said first one of said second unit lines by two-dimensional predictive coding using, as reference information, at least the information of said first one and said next one of the first unit lines, said operations of said second coding and said operation of said third coding being repeatedly achieved thereafter.

2. A method for interline-coding a facsimile signal comprising the steps of:
    alternately dividing information of scanning lines of an input facsimile signal into information of at least one first unit line and information of at least one second unit line;
    first coding information of a first one of said first unit lines in accordance with a predetermined coding principle;
    secondly coding the information of the next one of said first unit lines in accordance with a predetermined coding principle prior to coding of information of said first one of said second unit lines;
    separating the information of the first one of said second unit lines into a first area and a second area in accordance with coincidence and non-coincidence between the information of the coded lines immediately preceding and immediately succeeding each line to be coded; and
    thirdly coding information of said first area independently to processing information of said second area, said operation of said second coding to said operation of said third coding being repeatedly achieved thereafter.

3. A method for interline-coding a facsimile signal according to claim 2, in which said step of thirdly coding comprises coding the address of a mispredicted picture element resulting from a predetermined prediction processing of picture elements of at least one of said first area and said second area selected by a predetermined selection principle.

4. A method for interline-coding a facsimile signal according to claim 3, in which the address of said mispredicted picture element is indicated in terms of a distance between the mispredicted picture element and a mispredicted picture element immediately preceding the same.

5. A method for interline-coding a facsimile signal according to claim 3, in which the addresses of said mispredicted picture elements are alternately indicated by the run length of each true predicted run and by the run length of each mispredicted run.

6. A method for interline-coding a facsimile signal according to claim 3, in which the addresses of mispredicted picture elements are idnciated in terms of the number of said areas and the number of picture elements.

7. A method for interline-coding a facsimile signal according to claim 3, in which the addresses of the mispredicted picture elements are indicated in terms of the number of boundaries each between the first area and the second area and the number of picture elements.

8. A method for interline-coding a facsimile signal according to claim 3, in which said predetermined prediction processing is valid for only picture elements in the first area, whose run length exceeds a predetermined threshold value.

9. A method for interline-coding a facsimile signal according to claim 8, in which the code pattern of picture elements, whose run length is less than a predetermined threshold value, is employed as the last signal of the first area to eliminate coding of the run length of a last one of the first areas.

10. A method for interline-coding a facsimile signal according to claim 3, in which said predetermined selection processing is valid for only picture elements whose run length exceeds a predetermined threshold value.

11. A method for interline-coding a facsimile signal comprising the steps of:
alternately dividing information of scanning lines of an input facsimile signal into information of at least one first unit line and information of at least one second unit line;
first coding the information of a first one of said first unit lines in accordance with a predetermined a predetermined coding principle;
secondly coding the information of the next one of said first unit lines in accordance with a predetermined coding principle prior to coding of information of said first one of said second unit lines;
separating the information of the first one of the second unit lines into a first area and a second area in accordance with coincidence and non-coincidence between the information of the coded lines immediately preceding and immediately succeeding each line to be coded; and
processing the first area for a predetermined prediction to stop the sending out of the address of a mispredicted picture element, said secondly coding to the last mentioned processing being repeatedly achieved.

* * * * *